United States Patent
Lee et al.

(10) Patent No.: US 8,451,767 B2
(45) Date of Patent: *May 28, 2013

(54) METHOD AND APPARATUS FOR TRANSMITTING AND RECEIVING DATA VIA MEDIA ACCESS CONTROL PROTOCOL IN MOBILE COMMUNICATION SYSTEM

(75) Inventors: Seung-Hyun Lee, Seoul (KR); Jin-Young Oh, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 78 days.

This patent is subject to a terminal disclaimer.

(21) Appl. No.: 13/180,105

(22) Filed: Jul. 11, 2011

(65) Prior Publication Data
US 2011/0268040 A1     Nov. 3, 2011

Related U.S. Application Data

(63) Continuation of application No. 12/019,432, filed on Jan. 24, 2008, now Pat. No. 7,978,640.

(30) Foreign Application Priority Data

Jan. 24, 2007   (KR) ........................ 10-2007-0007466

(51) Int. Cl.
*H04L 12/28*     (2006.01)
*H04L 12/56*     (2006.01)
*H04J 3/24*      (2006.01)

(52) U.S. Cl.
USPC ........... 370/313; 370/328; 370/342; 370/389; 370/392; 370/474

(58) Field of Classification Search
USPC .................................. 370/313–528
See application file for complete search history.

(56) References Cited

U.S. PATENT DOCUMENTS

| 7,200,135 B2 * | 4/2007 | Choi et al. ..................... 370/348 |
| 7,545,807 B2 * | 6/2009 | Hwang et al. ................. 370/389 |
| 7,792,149 B2 * | 9/2010 | Hwang et al. ................. 370/476 |

(Continued)

FOREIGN PATENT DOCUMENTS

| KR | 1020030060026 | 7/2003 |
| KR | 1020060042858 | 5/2006 |
| KR | 1020060077521 | 7/2006 |
| KR | 1020060079784 | 7/2006 |

OTHER PUBLICATIONS

3rd Generation Partnership Project; Technical Specification Group Radio Access Network; HSPA Evolution Beyond Release 7 (FDD) Release 7, TSG-RAN Meeting #32, RP-060296, May 2006.

(Continued)

*Primary Examiner* — Afsar M Qureshi
(74) *Attorney, Agent, or Firm* — The Farrell Law Firm, P.C.

(57) ABSTRACT

A method and an apparatus for transmitting and receiving data via a MAC protocol in a mobile communication system. The method includes inputting an SDU including transmission data through a logical channel and generating a first PDU that includes the SDU without including multiplexing information for identification of the logical channel, by a first transmission entity; acquiring the first PDU and generating a second PDU including the first PDU in a payload of the second PDU, by a second transmission entity that operates between the first transmission entity and a physical layer; inserting the multiplexing information for identification of the logical channel corresponding to the first PDU into header information of the second PDU; and transmitting the second PDU through the physical layer.

8 Claims, 8 Drawing Sheets

U.S. PATENT DOCUMENTS

| | | | |
|---|---|---|---|
| 7,978,640 B2 * | 7/2011 | Lee et al. | 370/313 |
| 2003/0131124 A1 | 7/2003 | Yi et al. | |
| 2005/0013272 A1 | 1/2005 | Hwang et al. | |
| 2006/0146761 A1 | 7/2006 | Kim et al. | |
| 2006/0165045 A1 | 7/2006 | Kim et al. | |
| 2007/0133605 A1 * | 6/2007 | Herrmann | 370/473 |
| 2011/0149997 A1 * | 6/2011 | Yi et al. | 370/469 |

OTHER PUBLICATIONS

3rd Generation Partnership Project; Technical Specification Group Radio Access Network; Medium Access Control (MAC) Protocol Specification, (Release 6), 3GPP TS 25.321 V6.10.0, Sep. 2006.

* cited by examiner

METHOD AND APPARATUS FOR TRANSMITTING AND RECEIVING DATA VIA MEDIA ACCESS CONTROL PROTOCOL IN MOBILE COMMUNICATION SYSTEM

PRIORITY

This application is a Continuation of U.S. Ser. No. 12/019,432, which will issue as U.S. Pat. No. 7,978,640, on Jul. 12, 2011, and claims priority under 35 U.S.C. §119(a) to an application filed in the Korean Industrial Property Office on Jan. 24, 2007 and assigned Serial No. 2007-7466, the content of both of which are hereby incorporated by reference.

BACKGROUND OF THE INVENTION

1. Field of the Invention

The present invention relates generally to a mobile communication system, and more particularly to a method and an apparatus for transmitting and receiving data in a Media Access Control (MAC) layer.

2. Description of the Related Art

A UMTS (Universal Mobile Telecommunication Service) system, known as the 3rd Generation mobile communication system, employs a Wideband Code Division Multiple Access (WCDMA) based on General Packet Radio Services (GPRS) and Global System for Mobile Communications (GSM), which are European mobile communication systems. Based on the 3GPP (3rd Generation Partnership Project) standard, the UMTS system can provide a consistent service by which a user of a mobile phone or a computer can transmit packet-based text, digitized voice or video data, or multimedia data at a high speed of at least 2 Mbps wherever the user is located in the world. The UMTS uses a concept of virtual access, that is, a packet exchange-based access using a packet protocol such as an Internet Protocol (IP). The UMTS can always connect to any terminal within its network.

In order to support a High Data Rate (HDR), a High Speed Packet Access (HSPA) system such as 3rd Generation Partnership Project (3GPP) requires performance improvement for a Radio Link Control (RLC) and a Media Access Control (MAC) corresponding to a layer-2 protocol.

The MAC layer is connected to RLC layer entities and/or Packet Data Convergence Protocol (PDCP) layer entities through Logical Channels (LCHs), and generates a Protocol Data Unit (PDU) by multiplexing Service Data Units (SDUs) delivered from the RLC layer entities and then attaching a MAC header to the multiplexed SDUs. Such a PDU output from the MAC layer is called a MAC-PDU.

A MAC header includes information fields relating to the SDUs within the MAC-PDU. Herein, since each of the information fields has a size of one or more bits, the entire size of the MAC header does not correspond to a multiple of 8 bits (one byte) in most instances. In this case, the remaining PDU after removal of the MAC header is in a state in which byte alignment is broken. Therefore, in order to process a PDU with unaligned bytes within a memory, a receiver must perform a bit operation in which the start and end of the PDU are bit-masked and the resultant data is then read. As a result, the bit operation is performed twice for each PDU. Accordingly, the receiver spends excessive processing time over the whole layer-2 stack, which results in unnecessary consumption of Control Processing Unit (CPU) clock and power.

The most widely used solution for avoiding a bit operation during data processing is to perform a memory copy. However, the memory copy in a mobile communication system requiring a high data rate may increase consumption of system resources, which results in reduction of the data rate.

SUMMARY OF THE INVENTION

Accordingly, the present invention has been made to solve the above-mentioned problems occurring in the prior art, and the present invention provides a method and an apparatus for improving efficiency in a MAC layer operation for High Speed Packet Access (HSPA).

Also, the present invention provides a method and an apparatus for reducing load and delay due to an additional processing of a receiver in a MAC layer.

Also, the present invention provides a method and an apparatus for efficiently constructing header information in a MAC layer, so as to identify logical channels by using a small number of bits.

Also, the present invention provides a method and an apparatus for byte-aligning a header of a MAC PDU in a MAC layer.

In accordance with an aspect of the present invention, there is provided a method for transmitting data via a MAC protocol in a mobile communication system, the method including inputting at least one Service Data Unit (SDU) containing transmission data through a corresponding logical channel and generating at least one first Protocol Data Unit (PDU) that includes said at least one SDU without including multiplexing information for identification of the logical channel, by a first transmission entity; acquiring the first PDU and generating a second PDU including the first PDU in a payload of the second PDU, by a second transmission entity that operates between the first transmission entity and a physical layer; inserting the multiplexing information for identification of the logical channel corresponding to said at least one first PDU into header information of the second PDU; and transmitting the second PDU through the physical layer.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Hereinafter, various embodiments of the present invention will be described with reference to the accompanying drawings. In the following description, a detailed description of known functions and configurations incorporated herein will be omitted when it may make the subject matter of the present invention rather unclear. Terms used herein are defined in consideration of their functions in the present invention and may change depending on an intention or custom of a user or an operator. Therefore, those terms should be defined on the basis of the entire contents of the present specification.

A main idea of the present invention is to achieve byte alignment of a MAC header by efficiently identifying logical channels in a MAC header contained within a MAC Protocol Data Unit (PDU) in a MAC layer of a mobile communication system supporting HSPA.

The following detailed description of the present invention is based on a 3GPP (3rd Generation Partnership Project) LTE (Long-Term Evolution) system. However, a MAC operation for HSPA according to the present invention is also applicable to other mobile communication systems having similar technical backgrounds and channel types, with slight modification without departing from the scope of the present invention.

As one example of a MAC layer operation, a MAC structure for supporting High Speed Downlink Packet Access (HS-DPA) of the 3GPP system will now be described. When the HSDPA is employed, the MAC layer is classified into a MAC-d sub-layer that controls dedicated transmission channels in order to support the typical multiplexing operation according to a MAC protocol, and a MAC-hs sub-layer that controls High Speed Downlink Shared Channel (HS-DSCH) in order to additionally support the HSDPA operation.

Figure 1:
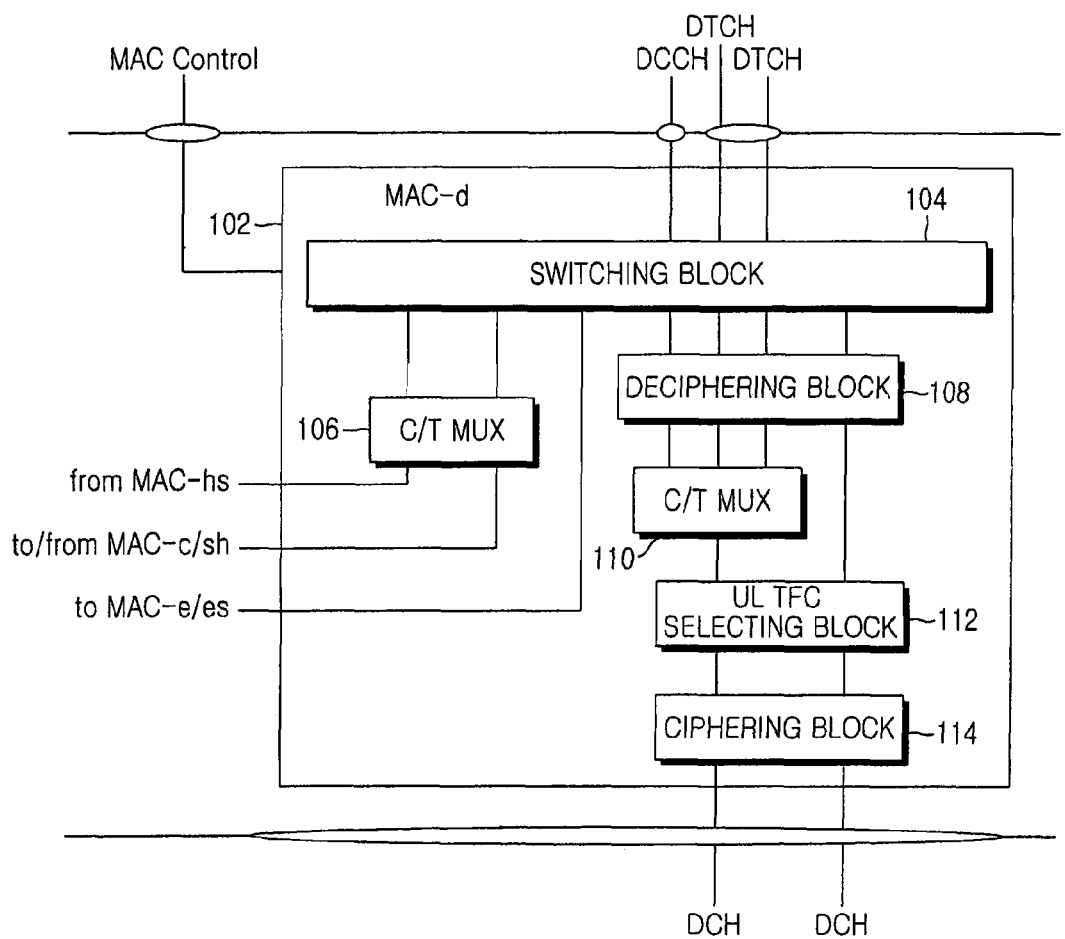
FIG. 1 is a block diagram illustrating a MAC-d sub-layer structure of a UE side according to an embodiment of the present invention.

FIG. 1 is a block diagram illustrating a structure of a MAC-d sub-layer of a User Equipment (UE) side according to one embodiment of the present invention.

Referring to FIG. 1, in order to communicate with entities including a MAC-hs entity supporting an HSDPA operation, a MAC-c/sh entity for control signaling, and a MAC-e/es entity for transmission and signaling of Enhanced uplink Dedicated Channel (E-DCH) for High Speed Uplink Packet Access (HSUPA), a MAC-d entity 102 includes a switching block 104, a deciphering block 108, Control and Traffic Multiplexers (C/T MUXs) 106 and 110, an Up-Link (UL) Transport Format Combination (TFC) selecting block 112, and a ciphering block 114.

The ciphering block 114 encodes MAC-d PDUs, and the UL TFC selecting block 112 selects a TFC indicating transport formats of transmission channels used for UL transmission. The C/T MUXs 110 and 106 analyze header information of the MAC-d PDUs, so as to demultiplex the MAC-d PDUs into MAC-d SDUs or generate MAC-d PDUs by multiplexing the MAC-d SDUs with header information. The deciphering block 108 decodes the encoded MAC-d SDUs. The switching block 104 maps MAC-d SDUs (which are also called "MAC SDUs") of a Dedicated Control Channel (DCCH) and a Dedicated Traffic Channel (DTCH), which are logical channels, to corresponding transmission channels according to the transmission channel types.

Figure 2:
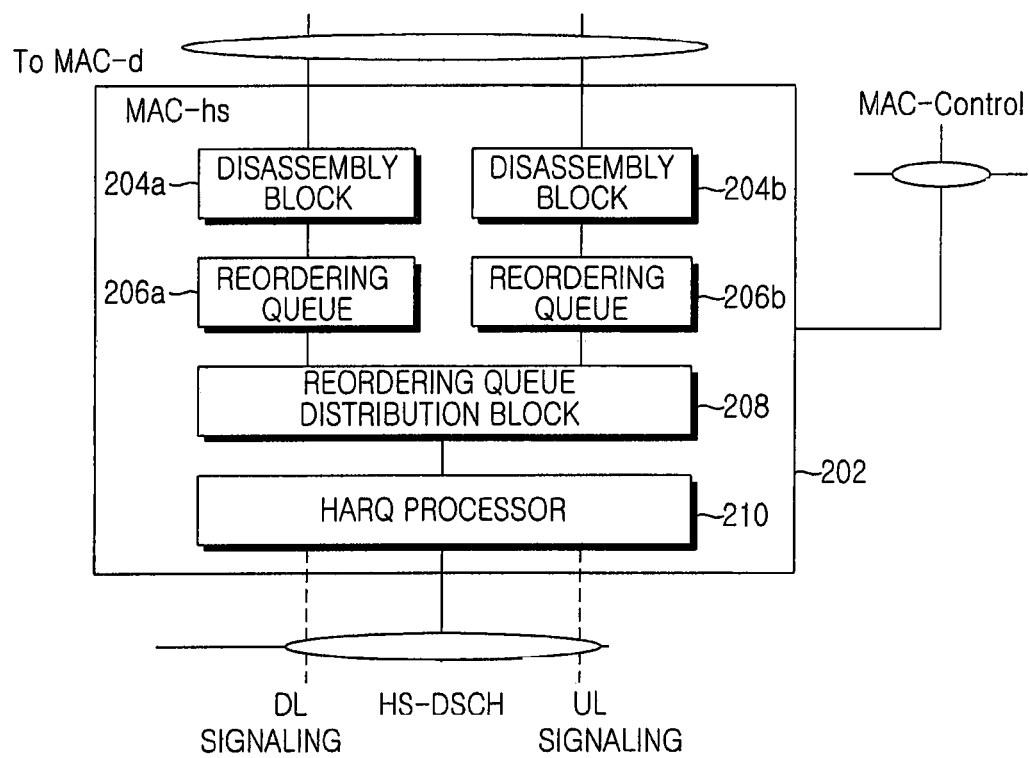
FIG. 2 is a block diagram illustrating a MAC-hs sub-layer structure of a UE side according to an embodiment of the present invention.

FIG. 2 is a block diagram illustrating a structure of a MAC-hs sub-layer of a UE side according to one embodiment of the present invention.

Referring to FIG. 2, in order to support an HSDPA operation between the MAC-d entity and a physical layer, a MAC-hs entity 202 includes disassembly blocks 204a and 204b (204), reordering queues 206a and 206b (206), a reordering queue distribution block 208, and a Hybrid Automatic Repeat reQuest (HARQ) processor 210.

The HARQ processor 210 receives MAC-hs PDUs from the physical layer through an HS-DSCH for supporting HSDPA and performs an HARQ operation. Then, the HARQ processor 210 delivers MAC-hs PDUs successfully received through the HARQ operation to the reordering queue distribution block 208. The reordering queue distribution block 208 analyzes header information of the MAC-hs PDUs and delivers the analyzed MAC-hs PDUs to the reordering queues 206 corresponding to associated DCHs. The reordering queues 206 store the MAC-hs PDUs until the disassembly blocks 204 make a request for reading of the MAC-hs PDUs. The disassembly blocks 204 read the MAC-hs PDUs stored in the reordering queues 206, disassemble the read MAC-hs PDUs into MAC-hs SDUs, and then outputs the disassembled MAC-hs SDUs as MAC-d PDUs to the MAC-d entity.

Figure 3:
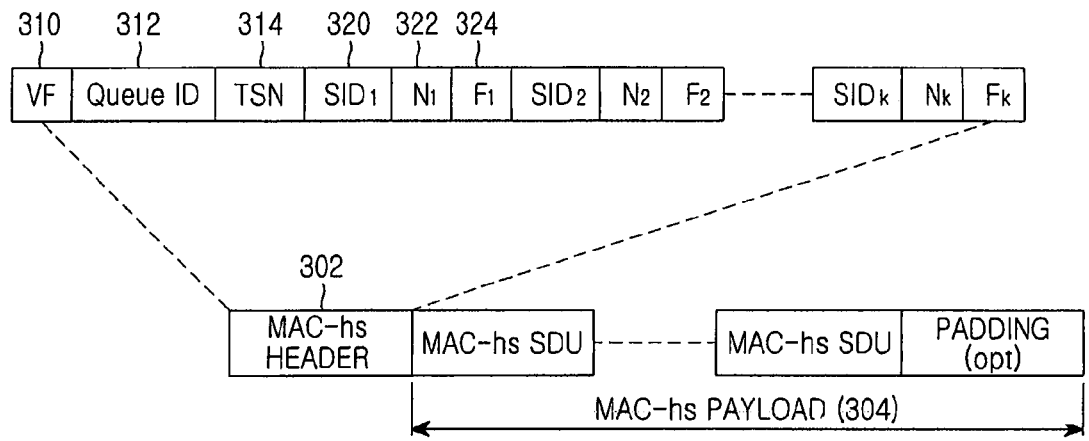
FIG. 3 illustrates a format and a function of a MAC-hs PDU according to an embodiment of the present invention.

FIG. 3 illustrates a format and a function of a MAC-hs PDU according to one embodiment of the present invention.

Referring to FIG. 3, the MAC-hs PDU includes a MAC-hs header 302 and a MAC-hs payload 304. The MAC-hs payload 304 contains a plurality of MAC-hs SDUs (i.e. MAC-d PDUs) corresponding to at least one logical channel, and the MAC-hs header 302 contains format information concerning the MAC-d PDUs. The MAC-hs payload 304 optionally contains padding for byte alignment of the entire MAC-hs PDU. Information fields contained in the MAC-hs header 302 are as follows.

Version Flag (VF) 310 has a length of 1 bit and indicates a protocol version for a MAC-hs PDU format.

Queue identifier (Queue ID) 312 has a length of 3 bits and identifies reordering queues of a receiving side.

Transmission Sequence Number (TSN) 314 has a length of 6 bits and indicates a sequence number used to reorder MAC-hs PDUs.

Size Index Identifier (SID) 320 has a length of 3 bits and indicates the same size of consecutive MAC-d PDUs.

The number of MAC-d PDUs (N) 322 has a length of 7 bits and indicates the number of successive MAC-d PDUs with the same size.

Flag (F) 324 has a length of 1 bit and indicates if there exists a further information field constituting the MAC-hs header 302. When the F field 324 has a value of "1," this implies the end of the MAC-hs header 302.

Herein, the combination of the SID field 320, the N field 322, and the F field 324 represents a format of each of the multiplexed logical channels. The combination is repeated within the MAC-hs header 302 as many times as the number of multiplexed logical channels.

Figure 4:
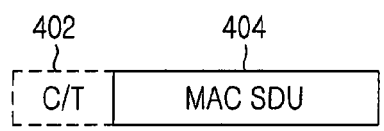
FIG. 4 illustrates a format and a function of a MAC-d PDU mapped to an HS-DSCH according to an embodiment of the present invention.

FIG. 4 illustrates a format and a function of a MAC-d PDU mapped to an HS-DSCH according to one embodiment of the present invention.

Referring to FIG. 4, the MAC-d PDU includes a C/T field 402 containing multiplexing information and a MAC SDU 404 corresponding to an RLC PDU. When a plurality of dedicated logical channels are mapped to the same MAC-d flow (i.e. HS-DSCH), the C/T field 402 has a length of 4 bits and identifies the logical channels.

Since the padding appended to the MAC-hs PDU shown in FIG. 3 is padding for byte alignment of the entire MAC-hs PDU, there is a high possibility that byte alignment of the MAC-hs header 302 may not be achieved. Usually, there is a limit in the maximum number of MAC-d PDUs that can be transmitted during one Transmission Time Interval (TTI). For example, in a worst-case scenario in which the maximum number of the MAC-d PDUs is 70, 70 MAC-d PDUs include 70 RLC PDUs, and the RLC PDUs are mapped to RLC SDUs with a ratio of 1:1, the 70 RLC PDUs serve as 70 higher layer PDUs. If the MAC-hs header does not have a size corresponding to a multiple of one byte, a UE must perform, during one TTI, a total of 420 times of additional bit operations including two times of bit operation for each of the maximum 210 PDUs as noted from an equation defined below.

$$70(\text{MAC-}d\text{ PDU}) + 70(\text{RLC PDU}) + 70(\text{PDCP PDU}) = 210(\text{PDUs})$$

Moreover, when a MAC-d PDU includes a C/T field having a size of 4 bits, even though a MAC header has a size corresponding to a multiple of one byte, the byte alignment is broken again, which causes unnecessary processing load within the UE.

Furthermore, in the case of employing the structure of FIG. 3, even if only two logical channels are multiplexed, the UE must perform the bit operation for 70 C/T fields, and network resources are wasted due to transmission of the C/T fields. Such waste of the network resources is more acute, given the fact that only a few logical channels are multiplexed under an actual radio environment. According to the embodiment described later, the MAC-d entity does not identify logical channels by using the C/T fields of the PDUs transmitted from a MAC-hs entity. Instead, the logical channels are identified in the MAC-hs entity itself. In other words, a field for identifying logical channels is inserted into a MAC-hs header.

Figure 5:
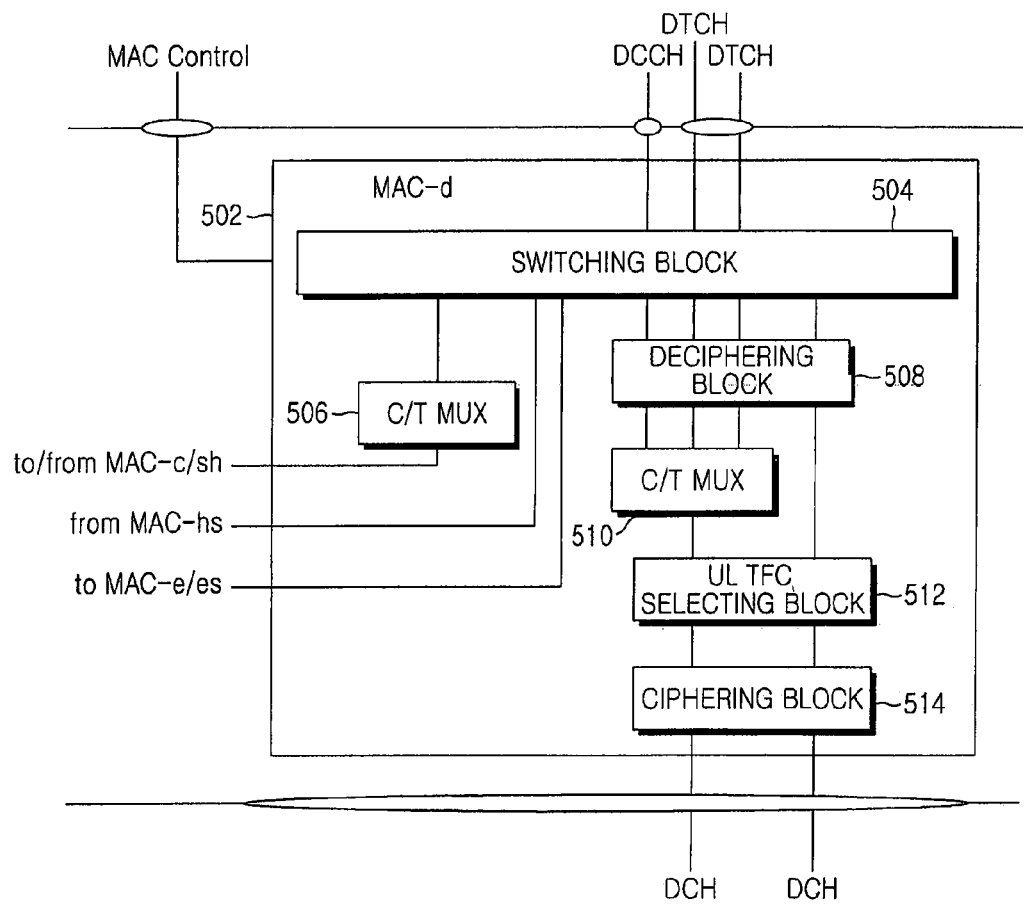
FIG. 5 is a block diagram illustrating a MAC-d sub-layer structure of a UE side according to an embodiment of the present invention.

FIG. 5 is a block diagram illustrating a MAC-d sub-layer structure of a UE side according to an embodiment of the present invention.

Referring to FIG. 5, in order to communicate with entities including a MAC-hs entity supporting HSDPA operation, a MAC-c/sh entity for control signaling, and a MAC-e/es entity for transmission and signaling of Enhanced uplink Dedicated Channel (E-DCH) for High Speed Uplink Packet Access (HSUPA), a MAC-d entity 502 includes a switching block 504, a deciphering block 508, C/T MUXs 506 and 510, a UL TFC selecting block 512, and a ciphering block 514. Compared to the structure of FIG. 1, when the MAC-hs entity operates in the structure of FIG. 5, the switching block 504 processes data directly received from the MAC-hs entity without passing through the C/T MUX 506.

The ciphering block 514 encodes MAC-d PDUs and the UL TFC selecting block 512 selects a TFC indicating transport formats of transmission channels used for UL transmission. The C/T MUXs 510 and 506 analyze header information of the MAC-d PDUs, so as to demultiplex the MAC-d PDUs into MAC-d SDUs or generate MAC-d PDUs by multiplexing the MAC-d SDUs with header information. The deciphering block 508 decodes the encoded MAC-d SDUs. The switching block 504 maps MAC-d SDUs (which are also called "MAC SDUs") of a Dedicated Control Channel (DCCH) and a Dedicated Traffic Channel (DTCH), which are logical channels, to corresponding transmission channels according to the transmission channel types.

Figure 6:
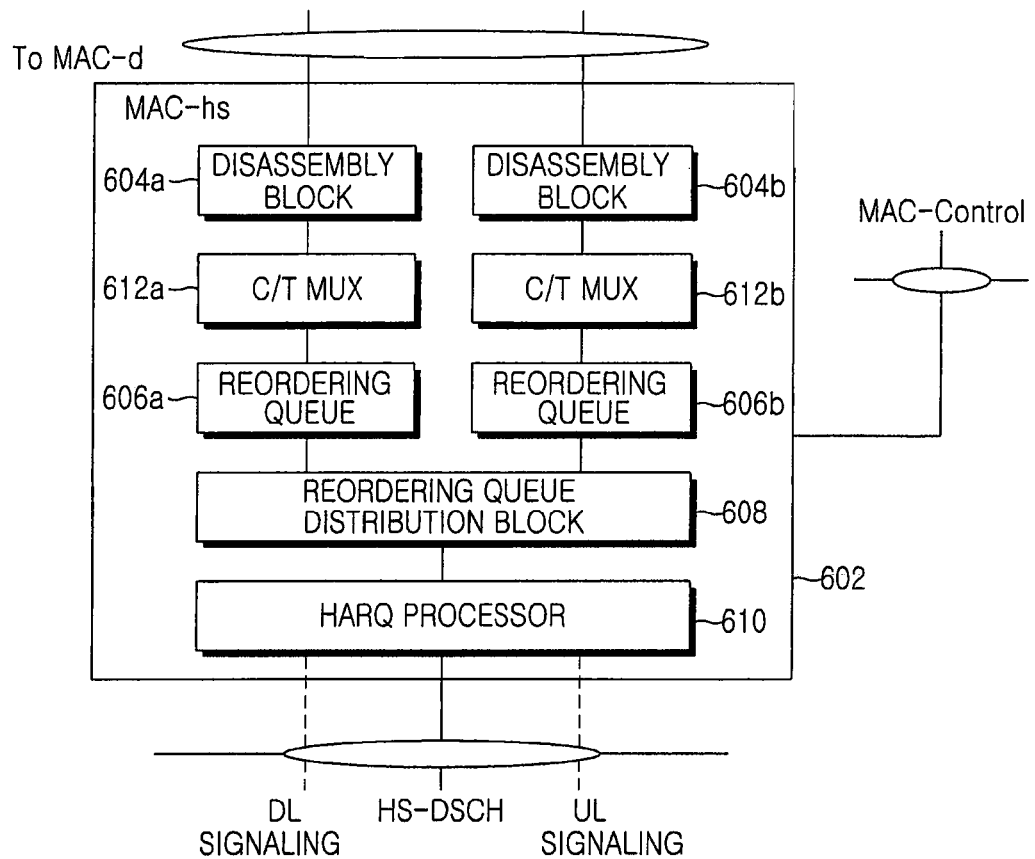
FIG. 6 is a block diagram illustrating a MAC-hs sub-layer structure of a UE side for identifying logical channels according to an embodiment of the present invention.

FIG. 6 is a block diagram illustrating a MAC-hs sub-layer structure of a UE side for identifying logical channels according to an embodiment of the present invention.

Referring to FIG. 6, in order to support an HSDPA operation between the MAC-d entity and a physical layer, a MAC-hs entity 602 includes disassembly blocks 604a and 604b (604), C/T MUXs 612a and 612b (612), reordering queues 606a and 606b (606), a reordering queue distribution block 608, and a Hybrid Automatic Repeat reQuest (HARQ) processor 610.

The HARQ processor 610 receives MAC-hs PDUs from the physical layer on an HS-DSCH for supporting HSDPA and performs an HARQ operation. Then, the HARQ processor 610 delivers the MAC-hs PDUs successfully received through the HARQ operation to the reordering queue distribution block 608. The reordering queue distribution block 608 analyzes header information of the MAC-hs PDUs and delivers the analyzed MAC-hs PDUs to the reordering queues 606 corresponding to the associated DCHs. The reordering queues 606 store the MAC-hs PDUs until the C/T MUXs 612 read the MAC-hs PDUs. The C/T MUXs 612 located between the reordering queues 606 and the disassembly blocks 604 refer to C/T fields contained in MAC-hs headers of the MAC-hs PDUs, so as to identify and demultiplex MAC-hs SDUs contained in the MAC-hs PDU based on corresponding logical channels. The disassembly blocks 604 disassemble the demultiplexed data delivered from the C/T MUXs 612 into MAC-hs SDUs corresponding to each of the logical channels, and then outputs the disassembled MAC-hs SDUs as MAC-d PDUs to the MAC-d entity.

As described above, according to the embodiment of the present invention, a C/T field is inserted into each MAC-hs header, and a MAC-hs entity identifies the multiplexed logical channels within a MAC-hs PDU by using the inserted C/T fields. Since MAC-d PDUs having the same size are used during one TTI for the logical channels, the MAC-d PDUs of the logical channels identified by the C/T fields have the same size. Therefore, MAC-d PDUs included in a data part corresponding to one logical channel identified by a C/T field have the same SID/N/F field values.

Figure 7:
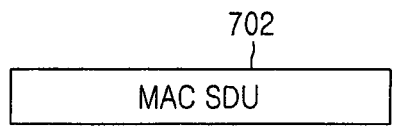
FIG. 7 illustrates a format and a function of a MAC-d PDU without its header according to an embodiment of the present invention.

As described above, the MAC-hs entity performs identification of the logical channels. Therefore, the MAC-d PDU does not have to contain header information for identification of logical channels. FIG. 7 illustrates a MAC-d PDU format without a header for identification of logical channels according to an embodiment of the present invention. Referring to FIG. 7, the MAC-d PDU includes only a MAC SDU 702 corresponding to an RLC PDU without header information. Therefore, the MAC-d PDU has the same size as the MAC-hs SDU.

Figure 8:
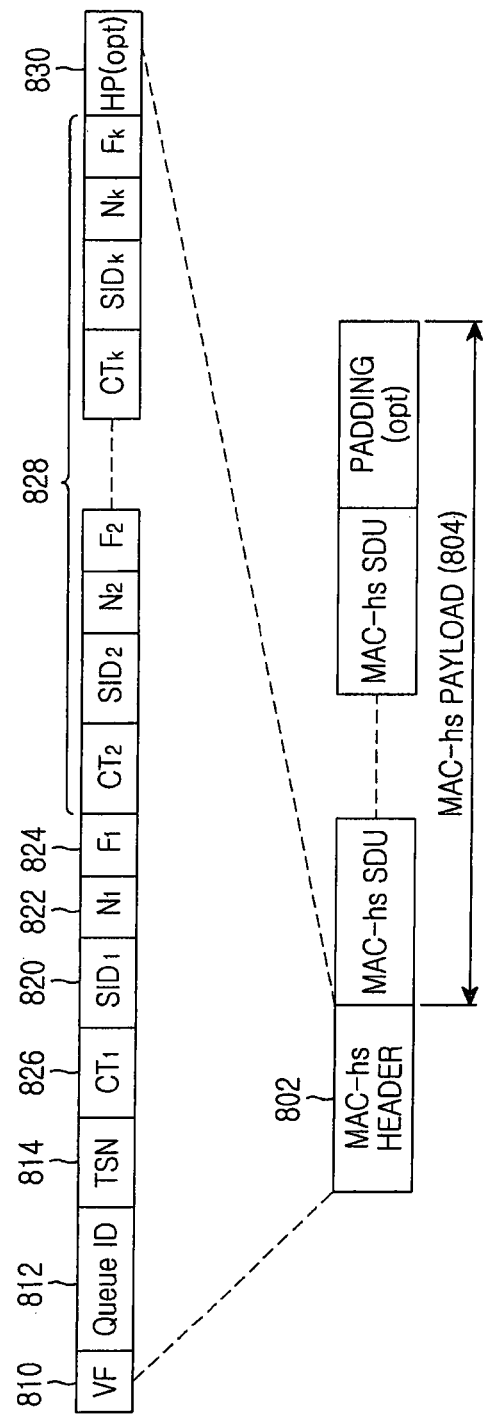
FIG. 8 illustrates a format and a function of a MAC-hs PDU containing multiplexing information for identification of logical channels within its header according to an embodiment of the present invention.

FIG. 8 illustrates a format and a function of a MAC-hs PDU containing multiplexing information for identification of logical channels within its header according to an embodiment of the present invention.

Referring to FIG. 8, the MAC-hs PDU includes a MAC-hs header 802 and a MAC-hs payload 804. The MAC-hs payload 804 contains a plurality of MAC-hs SDUs (i.e. MAC-d PDUs) corresponding to multiple logical channels, and the MAC-hs header 802 contains format and multiplexing information concerning the MAC-d PDUs. The MAC-hs payload 804 optionally contains padding for byte alignment of the entire MAC-hs PDU. Information fields contained in the MAC-hs header 802 are as follows.

VF 810 has a length of 1 bit and indicates a protocol version for a MAC-hs PDU format.

Queue ID 812 has a length of 3 bits and identifies reordering queues of a receiving side.

TSN 814 has a length of 6 bits and indicates a sequence number used to reorder MAC-hs PDUs.

SID 820 has a length of 3 bits and indicates the same size of successive MAC-d PDUs.

The number of MAC-d PDUs (N) 822 has a length of 7 bits and indicates the number of successive MAC-d PDUs with the same size.

F 824 has a length of 1 bit and indicates if there exists a further information field constituting the MAC-hs header 802. When the F field 824 has a value of "1", this implies the end of the MAC-hs header 802.

C/T field (CT) 826 has, for example, a length of 4 bits and identifies the logical channels when multiple dedicated logical channels are mapped to the same MAC-d flow (i.e. HS-DSCH).

Herein, the combination of the SID field 820, the N field 822, the F field 824, and the C/T field 826 represents a format of each of the multiplexed logical channels. The combination is repeated within the MAC-hs header 802 as many times as the number of multiplexed logical channels. By using the structure of the MAC-hs header 802 as described above, it is possible to construct the MAC-d PDU format while identifying logical channels, even without repeatedly using a plurality of identical fields for multiple MAC-d PDUs of one logical channel.

The order of the information fields located in the above-described combination can be variously selected according to the design of a system. As shown in FIG. 8, the C/T field 826 is present within the MAC-hs header, and the MAC-hs entity identifies logical channels multiplexed within the MAC-hs PDU by using the C/T field 826.

A Header Padding (HP) field 830 is appended to the end of the MAC-hs header 802. The HP field 830 is a variable field having a bit size of 0 to 7. The bit size is determined from among values of 0 to 7 such that the entire MAC-hs header has a size corresponding to a multiple of one byte (8 bits). All of the bit values contained in the HP field 830 usually have a value of zero (all '0'). The end of the MAC-hs header 802 except for the HP field 830 is identified by an F field having a value of "1". Therefore, a UE can recognize that the first MAC-hs SDU (i.e. MAC-hs payload 804) starts from the first byte directly following the F field having a value of "1."

Meanwhile, when the MAC-hs PDU does not include plural multiplexed logical channels, the MAC-hs header 802 does not have to contain C/T fields for identification of the logical channels. Therefore, a C/T field is set to have a particular value that is not used for identification of a logical channel, for example, "1111", as a value for indicating "No multiplexing (Non MUX)." When a UE identifies that the first C/T field has a value of "1111", the UE determines that there exists no more C/T field. For example, Table 1 below shows definition of values of the C/T field.

TABLE 1

| C/T field | definition |
|---|---|
| 0000 | LC 1 |
| 0001 | LC 2 |
| ... | ... |
| 1110 | LC 15 |
| 1111 | Non Mux |

Figure 9:
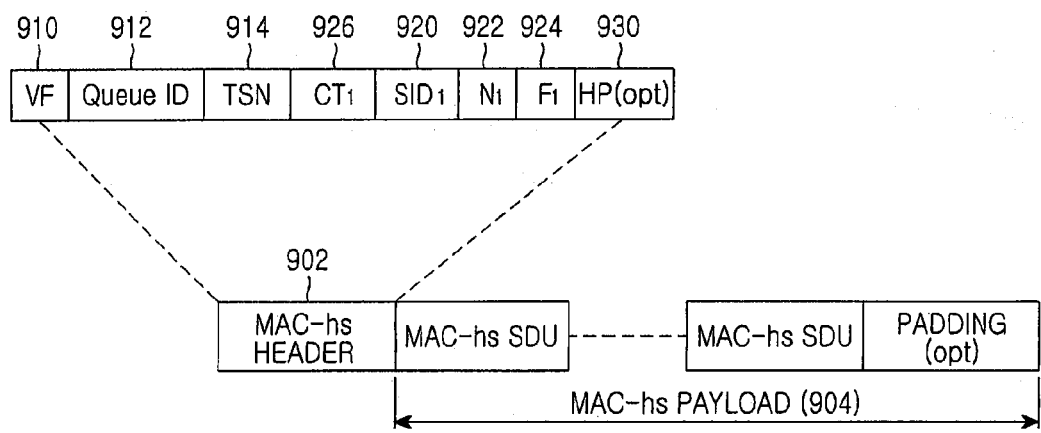
FIG. 9 illustrates a format and a function of a MAC-hs PDU including no multiplexed logical channels according to an embodiment of the present invention.

FIG. 9 illustrates a format and a function of a MAC-hs PDU including no multiplexed logical channels according to an embodiment of the present invention.

Referring to FIG. 9, the MAC-hs PDU includes a MAC-hs header 902 and a MAC-hs payload 904. Since the MAC-hs PDU does not include multiplexed logical channels, the MAC-hs payload 904 contains MAC-hs SDUs (i.e. MAC-d PDUs) corresponding to one logical channel, and the MAC-hs header 902 contains format and multiplexing information for the MAC-d PDUs. The MAC-hs payload 904 optionally contains padding for byte alignment of the entire MAC-hs PDU. Information fields contained in the MAC-hs header 902 are as follows.

VF 910 has a length of 1 bit and indicates a protocol version of a MAC-hs PDU format.

Queue ID 912 has a length of 3 bits and identifies reordering queues of a receiving side.

TSN 914 has a length of 6 bits and indicates a sequence number used to reorder MAC-hs PDUs.

SID 920 has a length of 3 bits and indicates the same size of successive MAC-d PDUs.

N 922 has a length of 7 bits and indicates the number of successive MAC-d PDUs with the same size.

F 924 has a length of 1 bit and indicates if there exists a further information field constituting the MAC-hs header 802. When the F field 924 has a value of "1", this implies the end of the MAC-hs header 902.

CT field 926 has, for example, a length of 4 bits and identifies logical channels.

Herein, only one combination of the SID field 920, the N field 922, the F field 924, and the C/T field 926 exists within the MAC-hs header 302, and the C/T field 926 is set to "1111," which indicates that no logical channel multiplexing is used, and the F field 924 is set to have a value of "1" in order to indicate that it is the end of the MAC-hs header.

A Header Padding (HP) field 930 is appended to the end of the MAC-hs header 902. The HP field 930 is a variable field having a bit size of 0 to 7. The bit size is determined from among values of 0 to 7 such that the entire MAC-hs header has a size corresponding to a multiple of one byte (8 bits).

A MAC-d transmission entity provided at a transmitter in order to support the MAC-hs formats as shown in FIGS. 8 and 9 delivers an RLC PDU (i.e. MAC SDU) provided from an RLC layer entity to a MAC-hs transmission entity without appending a C/T field to the RLC PDU, that is, without identifying a corresponding logical channel. Then, the MAC-hs transmission entity configures a MAC-hs PDU including MAC-d PDUs provided from at least one RLC layer entity, and inserts a C/T field for identifying each logical channel into a MAC-hs header within the MAC-hs PDU. Further, when the MAC-hs header is not byte-aligned, the MAC-hs transmission entity appends a header padding field having a size necessary for the byte alignment to the MAC-hs header. To this end, the MAC-hs transmission entity receives information required to set a C/T field, from the MAC-d transmission entity or directly from the RLC layer entity.

Figure 10:
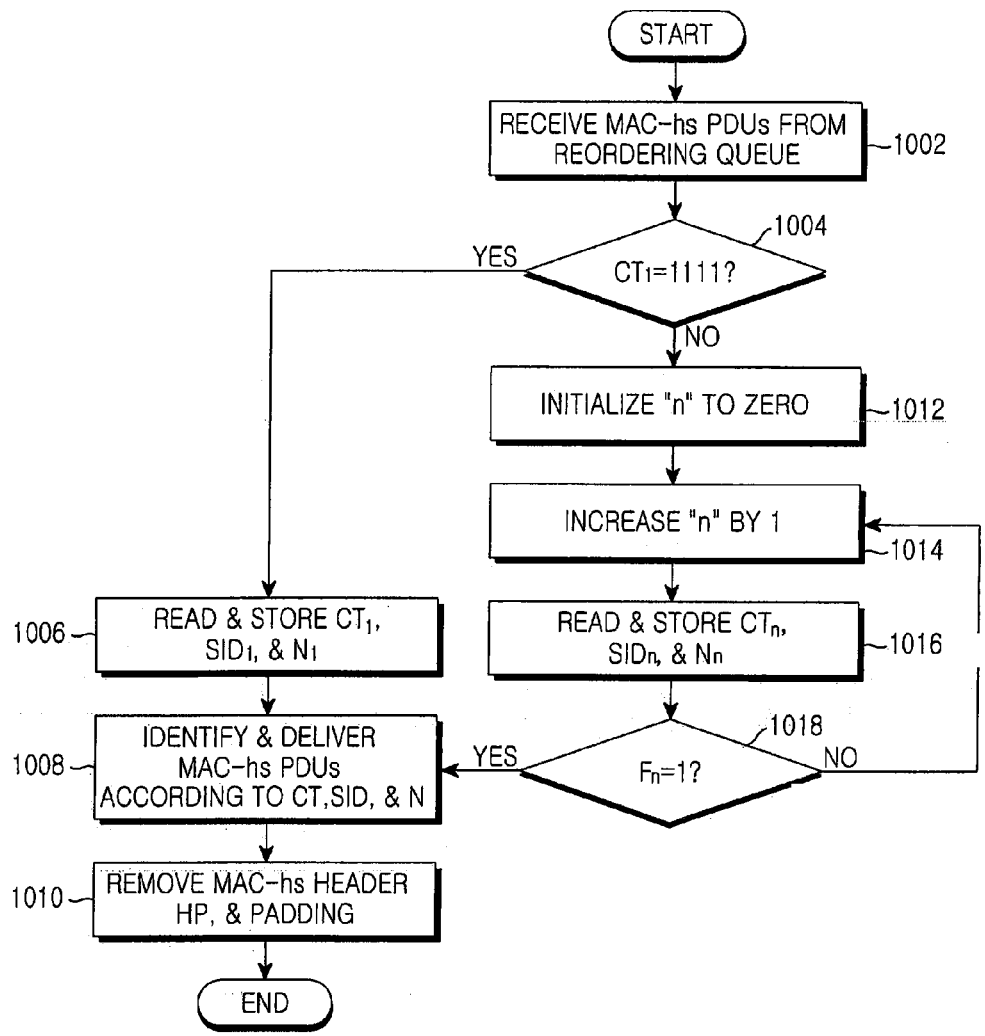
FIG. 10 is a flow diagram illustrating an operation of a receiver according to an embodiment of the present invention.

FIG. 10 is a flowchart showing an operation of a receiver according to an embodiment of the present invention.

Referring to FIG. 10, in step 1002, the receiver receives reordered MAC-hs PDU through the reordering queue. In step 1004, the receiver determines if logical channel multiplexing has been used, based on a value of the first C/T field (i.e. $CT_1$) contained in a MAC-hs header within the MAC-hs PDU. When the $CT_1$ has a value of "1111," the receiver determines that the logical channel multiplexing has not been used, the receiver proceeds to step 1006 in which the receiver reads a combination of $CT_1$, $SID_1$, and $N_1$ (i.e. the first header information) from the MAC-hs header, stores the read combination, and then proceeds to step 1008.

On the other hand, when logical channel multiplexing has been used, the receiver initializes a variable "n" for identification of logical channels to zero in step 1012. Then, in step 1014, the receiver increases the value of the variable "n" by one. In step 1016, the receiver reads a combination of $CT_1$, $SID_n$, and $N_n$ from the MAC-hs header and stores the read combination. Then, in step 1018, the receiver determines if an $F_n$ field subsequent to the read combination of the information fields has a value of "1," in order to determine if it is the end of the MAC-hs header. As a result of the determination in step 1018, when the $F_n$ field does not have a value of "1", the receiver returns to step 1014 in order to read a next information field of the MAC-hs header. Otherwise, the receiver proceeds to step 1008.

In step 1008, the receiver decodes at least one combination of the stored $CT_k$, $SID_k$, and $N_k$ (wherein k=0, 1, ..., n), identifies at least one MAC-d PDU contained in the MAC-hs PDU according to the decoded $CT_k$, $SID_k$, and $N_k$, and delivers the at least one MAC-d PDU to a MAC-d entity, which is a higher layer entity. In this case, the MAC-hs entity of the receiver delivers the C/T field extracted from the MAC-hs header to the MAC-d entity, so that the MAC-d entity can refer to the extracted C/T field in delivering the MAC-d PDU to an RLC layer entity through a corresponding logical channel. In step 1010, the receiver removes the information fields, the HP field, and the padding of the stored MAC-hs header, and then terminates the operation.

In the present invention as described above, it is possible to remove a bit operation and a bit offset managing operation, which may occur due to unaligned bytes in a header field, and it is possible to prevent waste of system resources due to memory copying, in a mobile communication system. That is, in the present invention, identification of logical channels is performed by a MAC-hs entity, and appending of a header padding (HP) field guarantees byte alignment for layer-2 PDUs. Moreover, the present invention can reduce load due to additional processing, such as a bit operation or memory copying, in a receiver requiring high speed data transmission.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for transmitting data via a Media Access Control (MAC) protocol in a mobile communication system, the method comprising the steps of:
   receiving, by a first transmission entity, a Service Data Unit (SDU) including transmission data to be transmitted, and generating a first Protocol Data Unit (PDU) including the SDU; and
   receiving, by a second transmission entity that operates between the first transmission entity and a physical layer, the first PDU, generating a second PDU including a payload that includes the first PDU, and transmitting the second PDU to the physical layer,
   wherein a header of the second PDU includes a first information field identifying a logical channel corresponding to the first PDU,
   wherein the second PDU is byte aligned in length, and
   wherein the header of the second PDU further includes a length field indicating a length of the first PDU and a second information field indicating whether or not more fields are present in the header.

2. The method of claim 1, wherein the payload of the second PDU includes a plurality of the first PDUs, and
   wherein the header of the second PDU includes a plurality of the first information fields for identifying logical channels corresponding to each of the plurality of the first PDUs, respectively.

3. A method for receiving data via a Media Access Control (MAC) protocol in a mobile communication system, the method comprising the steps of:
   receiving, by a first reception entity, a first Protocol Data Unit (PDU) including a header and a payload from a physical layer;
   reading information for identifying a logical channel corresponding to a second PDU included in the payload and format information of the second PDU, from the header of the first PDU;
   identifying the second PDU from the payload, based on the format information; and
   delivering the identified second PDU to a second reception entity,
   wherein the first PDU is byte aligned in length, and
   wherein the format information comprises a length field indicating a length of the first PDU and an information field indicating whether or not more fields are present in the header.

4. The method of claim 3, wherein the payload of the first PDU includes a plurality of the second PDUs, and
   wherein the header of the first PDU includes a plurality of the information for identifying logical channels corresponding to each of the plurality of the second PDUs, respectively.

5. An apparatus for transmitting data via a Media Access Control (MAC) protocol in a mobile communication system, the apparatus comprising:
   a first transmission entity for receiving a Service Data Unit (SDU) including transmission data to be transmitted and generating a first Protocol Data Unit (PDU) that includes the SDU; and
   a second transmission entity, which operates between the first transmission entity and a physical layer, for receiving the first PDU and generating a second PDU including a payload that includes the first PDU, and transmitting the second PDU to the physical layer,
   wherein a header of the second PDU includes a first information field identifying a logical channel corresponding to the first PDU,
   wherein the second PDU is byte aligned in length, and
   wherein the header of the second PDU further includes a length field indicating a length of the first PDU and a second information field indicating whether or not more fields are present in the header.

6. The apparatus of claim 5, wherein the payload of the second PDU includes a plurality of the first PDUs, and
   wherein the header of the second PDU includes a plurality of the first information fields for identifying logical channels corresponding to each the plurality of the first PDUs, respectively.

7. An apparatus for receiving data via a Media Access Control (MAC) protocol in a mobile communication system, the apparatus comprising:
   a first reception entity for receiving a first Protocol Data Unit (PDU) including a header and a payload from a physical layer, reading information for identifying a logical channel corresponding to a second PDU included in the payload and format information of the second PDU, from the header of the first PDU, identifying the second PDU from the payload, based on the format information, and outputting the second PDU; and
   a second reception entity for delivering the second PDU to a higher layer entity,
   wherein the first PDU is byte alignment in length, and
   wherein the format information comprises a length field indicating a length of the first PDU and an information field indicating whether or not more fields are present in the header.

8. The apparatus of claim 7, wherein the payload of the first PDU includes a plurality of the second PDUs, and
wherein the header of the first PDU includes a plurality of the information for identifying logical channels corresponding to each of the plurality of the second PDUs, respectively.

* * * * *